United States Patent
Park

(10) Patent No.: US 7,583,029 B2
(45) Date of Patent: Sep. 1, 2009

(54) HIGH TEMPERATURE OPERATION TYPE ELECTRODELESS BULB OF PLASMA LIGHTING SYSTEMS AND PLASMA LIGHTING SYSTEM HAVING THE SAME

(75) Inventor: Byeong-Ju Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 11/533,481

(22) Filed: Sep. 20, 2006

(65) Prior Publication Data

US 2007/0069659 A1    Mar. 29, 2007

(30) Foreign Application Priority Data

Sep. 23, 2005    (KR)    .................. 10-2005-0088975

(51) Int. Cl.
*H01J 17/20*    (2006.01)

(52) U.S. Cl. .............. 313/637; 313/161; 313/493; 315/39

(58) Field of Classification Search ............. 315/32, 315/39.51, 39.65, 112, 117–118; 313/485, 313/488, 491, 638, 161, 493, 637
See application file for complete search history.

(56) References Cited

U.S. PATENT DOCUMENTS

| | | | | |
|---|---|---|---|---|
| 2,007,929 | A | * | 7/1935 | Braselton ............... 315/46 |
| 5,363,015 | A | * | 11/1994 | Dakin et al. ............. 313/638 |
| 5,798,618 | A | * | 8/1998 | van Os et al. ............ 315/248 |
| 5,914,564 | A | * | 6/1999 | Gabor et al. ............ 315/39 |
| 6,313,587 | B1 | * | 11/2001 | MacLennan et al. ...... 315/248 |
| 6,469,444 | B1 | * | 10/2002 | Leng et al. .............. 313/637 |
| 6,734,630 | B1 | * | 5/2004 | Choi et al. ............. 313/638 |
| 7,129,639 | B2 | | 10/2006 | Kim et al. |
| 2003/0024180 | A1 | * | 2/2003 | Hartig et al. ........... 52/204.5 |
| 2003/0057842 | A1 | * | 3/2003 | Kim et al. .............. 315/39 |
| 2003/0218415 | A1 | * | 11/2003 | Matsuo ................ 313/485 |
| 2004/0120147 | A1 | * | 6/2004 | Jeon et al. ............. 362/260 |
| 2005/0122049 | A1 | | 6/2005 | Lee et al. |
| 2005/0128750 | A1 | | 6/2005 | Choi et al. |
| 2006/0087255 | A1 | | 4/2006 | Choi et al. |
| 2006/0087256 | A1 | | 4/2006 | Park et al. |

(Continued)

FOREIGN PATENT DOCUMENTS

CN    1412817    4/2003

(Continued)

OTHER PUBLICATIONS

U.S. Appl. No. 11/536,234 to Lee et al., filed Sep. 28, 2006.

(Continued)

*Primary Examiner*—David Hung Vu
*Assistant Examiner*—Tung X Le
(74) *Attorney, Agent, or Firm*—KED & Associates, LLP

(57) ABSTRACT

A high temperature operation type electrodeless bulb of a plasma lighting system includes: a luminous unit defining a space for enclosing luminous materials, and made of glass having selective permeability that transmits visible light generated from the luminous unit and reflects infrared rays to the interior; and a supporting unit extending from the luminous unit to have a particular length and supporting the luminous unit.

2 Claims, 4 Drawing Sheets

U.S. PATENT DOCUMENTS

2006/0087257 A1    4/2006    Choi et al.

FOREIGN PATENT DOCUMENTS

CN    1510715    7/2004
JP    03-269948    12/1991
KR    10-2006 0089153    11/2003

OTHER PUBLICATIONS

U.S. Appl. No. 11/536,271 to Jeon, filed Sep. 28, 2006.
U.S. Appl. No. 11/535,561 to Lee, filed Sep. 27, 2006.
U.S. Appl. No. 11/538,269 to Lee, filed Oct. 3, 2006.
English language Abstract of KR 10-2006-0089153.
Chinese Office Action dated Mar. 13, 2009.

* cited by examiner

HIGH TEMPERATURE OPERATION TYPE ELECTRODELESS BULB OF PLASMA LIGHTING SYSTEMS AND PLASMA LIGHTING SYSTEM HAVING THE SAME

RELATED APPLICATION

The present disclosure relates to a subject matter contained in priority Korean Application No. 10-2005-0088975, filed on Sep. 23, 2005, which is herein expressly incorporated by reference in its entirety.

BACKGROUND OF THE INVENTION

1. Field of the Invention

The present invention relates to a plasma lighting system using microwave, and more particularly, to a high temperature operation type electrodeless bulb of a plasma lighting system, which is capable of maintaining the temperature in the electrodeless bulb at a high level, and a plasma lighting system having the same.

2. Description of the Related Art

In general, a plasma lighting system (PLS) is a lighting system in which a high frequency is generated using a high frequency oscillator (magnetron) mainly used for a microwave oven, and such microwave converts a buffer gas in the bulb into a plasma state to enable a metal compound to continuously emit light, thereby providing light with excellent light intensity without an electrode.

FIG. 1 is a vertical cross sectional view showing one example of a conventional plasma lighting system. FIG. 2 is a front view showing a coupled state of an electrodeless bulb and a bulb motor in a conventional plasma lighting system. FIG. 3 is a graph for explaining a $S_3$ filter effect.

As shown therein, the plasma lighting system includes: a magnetron 20 installed inside a casing 10, for generating microwave; a high voltage generator 30 boosting the voltage of utility AC power and supplying it to the magnetron 20; a wave guide 40 connected to an outlet of the magnetron 20 and transmitting microwave generated in the magnetron 20; an electrodeless bulb 50 generating light by using enclosed materials in a plasma state by microwave energy; a resonator 60 covered on the front side of the wave guide 40 and electrodeless bulb 50, for intercepting the microwave and passing the light generated from the electrodeless bulb 50; a reflecting shade 70 receiving the resonator 60 and focus-reflecting the light generated in the electrodeless bulb 50 straightly; a dielectric mirror 80 installed inside the resonator 60 at the rear of the electrodeless bulb 50 in order to pass the microwave and reflect the light; and a cooling fan 90 placed at one side of the casing 10 and cooling the magnetron 20 and the high voltage generator 30.

The electrodeless bulb 50 is constructed with a luminous unit 51 having a predetermined inner volume, made of quartz, having enclosed luminous materials, for example, diatomic sulfur molecules ($S_2$), an inert gas, a discharge catalyst, sodium, etc. in order to emit lights by being turned into a plasma state, and placed outside the casing 10, and a supporting unit 52 integrally extended from the luminous unit 51 and supported by the inner side of the casing 10.

One end of the supporting unit 52 is coupled to a rotation shaft 111 of a bulb motor 110 by using a connecting member 100 of a hollow rod shape. The supporting unit 52 of the electrodeless bulb 50 is inserted and bonded and coupled to the connecting member 100, while the rotation shaft 111 of the bulb motor 110 is secured by screws.

In the drawings, unexplained reference numeral 120 is a fan motor.

The operation of the conventional plasma lighting system will be described below.

According to a command of a controller, the magnetron 20 oscillates due to a high voltage, and generates microwaves having a very high frequency. As the generated microwaves are emitted into the resonator 60 through the wave guide 40, the inert gas enclosed inside the electrodeless bulb 50 is excited. In this procedure, the luminous materials continuously generate plasma and generate light having an inherent emission spectrum.

The light generated from the electrodeless bulb 50 is reflected by the reflecting shade 70 and the dielectric mirror 80 and lights up a space. At this time, the bulb motor 110 is also supplied with a power, and as the rotation shaft 111 rotates the electrodeless bulb 50 at a predetermined speed while rotating, to thus prevent an electric field from being focused on the luminous unit 51 of the electrodeless bulb 50, as well as preventing an air current around the luminous unit 51 from being stagnated, thereby preventing damage of the electrodeless bulb 50. Further, the fan motor 120 cools the magnetron 20 and the high voltage generator 30 through the air introduced by rotating the cooling fan 90.

In such a plasma lighting system, as shown in FIG. 3, the diatomic sulfur molecules ($S_2$) enclosed in the luminous unit 51 are uniformly distributed over the entire part of the luminous unit 51, while triatomic sulfur molecules ($S_3$) are greatly increased in density around inner walls of the luminous unit 51. Such triatomic sulfur molecules ($S_3$) are dark-brown materials, and act as a filter for intercepting light This is called the $S_3$ filter effect (Transport and equilibrium in molecular plasmas: the sulfur lamp, C. W. Johnston, 2003, 59p). As a result, the $S_3$ filter effect reduces the emission efficiency of the luminous unit 51, so there is a need to alleviate this reduction.

Further, because quartz used as the luminous unit 51 is expensive glass, there is a need to substitute quartz with materials that exhibit the functions superior to those of quartz and are more economical.

BRIEF DESCRIPTION OF THE INVENTION

The present invention has been made in consideration of the above situation, and has as its object to provide a high temperature operation type electrodeless bulb of a plasma lighting system which is capable of high temperature operation, and has improved emission efficiency.

Furthermore, another object of the present invention is to provide a high temperature operation type electrodeless bulb of a plasma lighting system which is capable of high temperature operation because of a heat resistance superior to that of a conventional bulb.

Furthermore, still another object of the present invention is to provide a plasma lighting system having a high temperature operation type electrodeless bulb, which has improved emission efficiency and economic efficiency.

To accomplish the above-described objects, there is provided a high temperature operation type electrodeless bulb of a plasma lighting system according to one aspect of the present invention, including: a luminous unit defining a space for enclosing luminous materials, and made of glass having selective permeability that transmits visible light generated from the luminous materials and reflects infrared rays to the interior; and a supporting unit extending from the luminous unit to have a particular length and supporting the luminous unit.

There is provided a high temperature operation type electrodeless bulb of a plasma lighting system according to another aspect of the present invention, including: a luminous unit defining a space for enclosing luminous materials, and made of borosilicate glass which enables an absorption of heat; and a supporting unit extending from the luminous unit to have a particular length and supporting the luminous unit.

There is provided a plasma lighting system having a high temperature operation type electrodeless bulb according to another aspect of the present invention, including: a high voltage generator; a magnetron generating microwaves by receiving the high voltage generated from the high voltage generator; an electrodeless bulb generating light by using enclosed luminous materials in a plasma state by receiving the microwave generated from the magnetron according to one of claims 1 through 3; and a resonator covered on the electrodeless bulb, for intercepting the microwave and passing the light.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
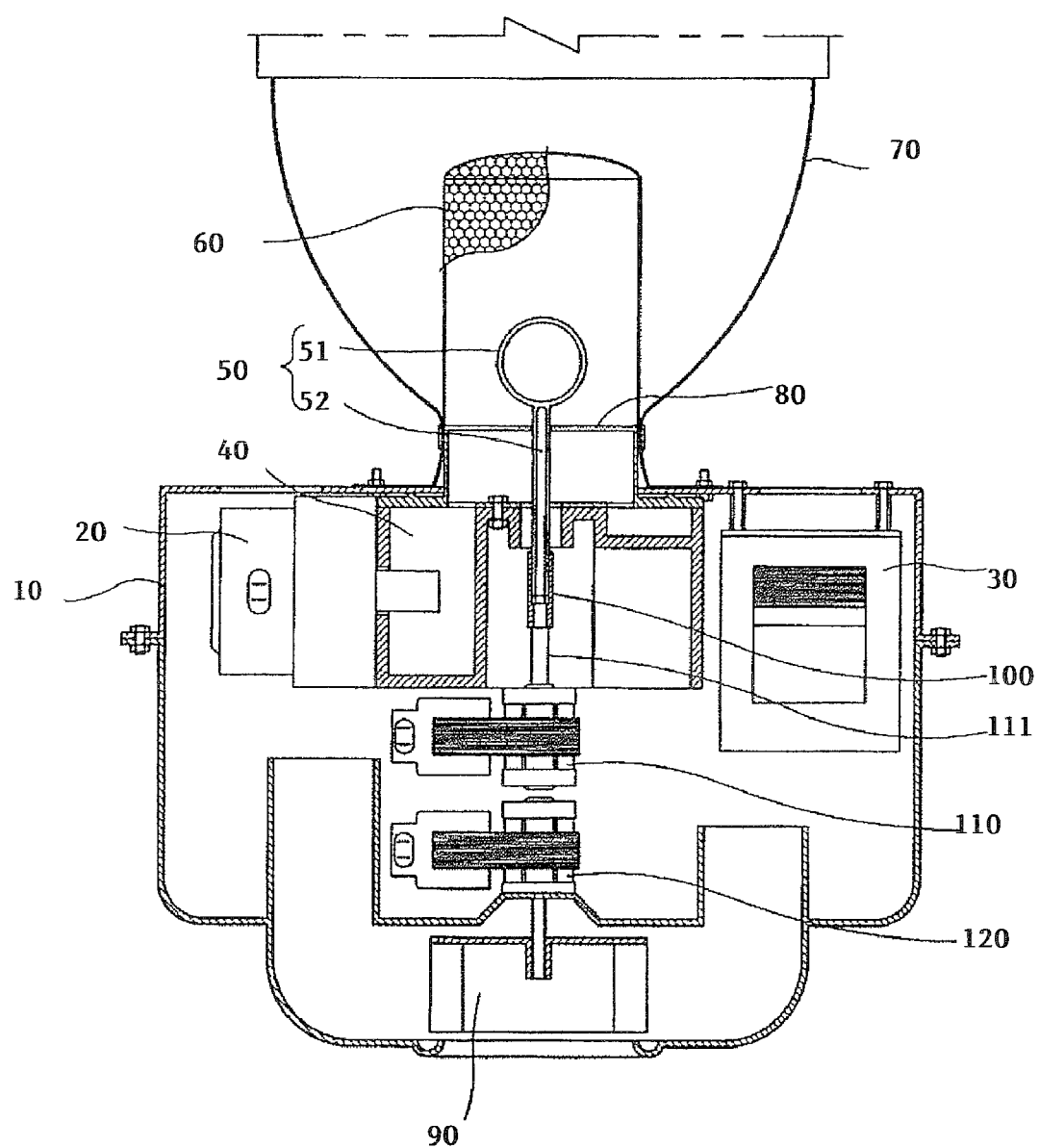
FIG. 1 is a vertical cross sectional view showing one example of a conventional plasma lighting system.
Figure 2:
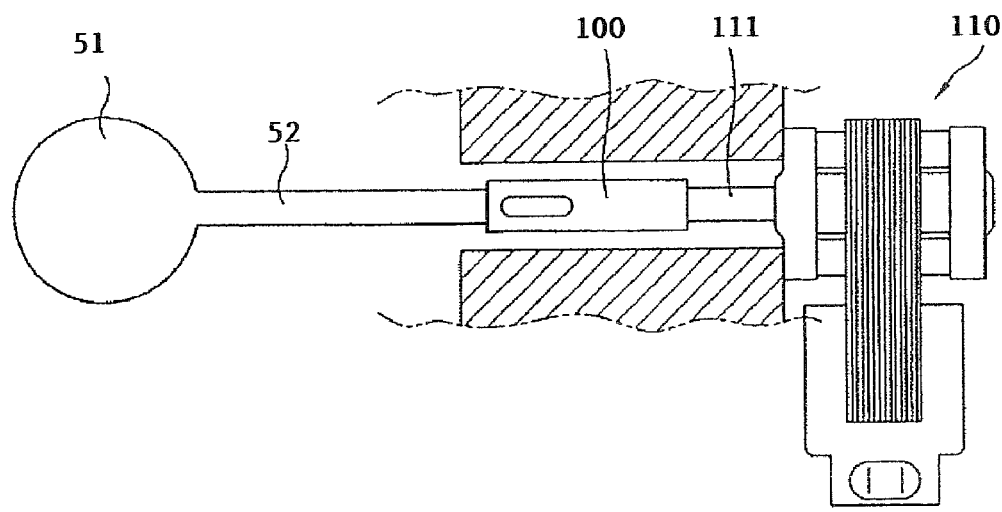
FIG. 2 is a front view showing a coupled state of an electrodeless bulb and a bulb motor in a conventional plasma lighting system.
Figure 3:
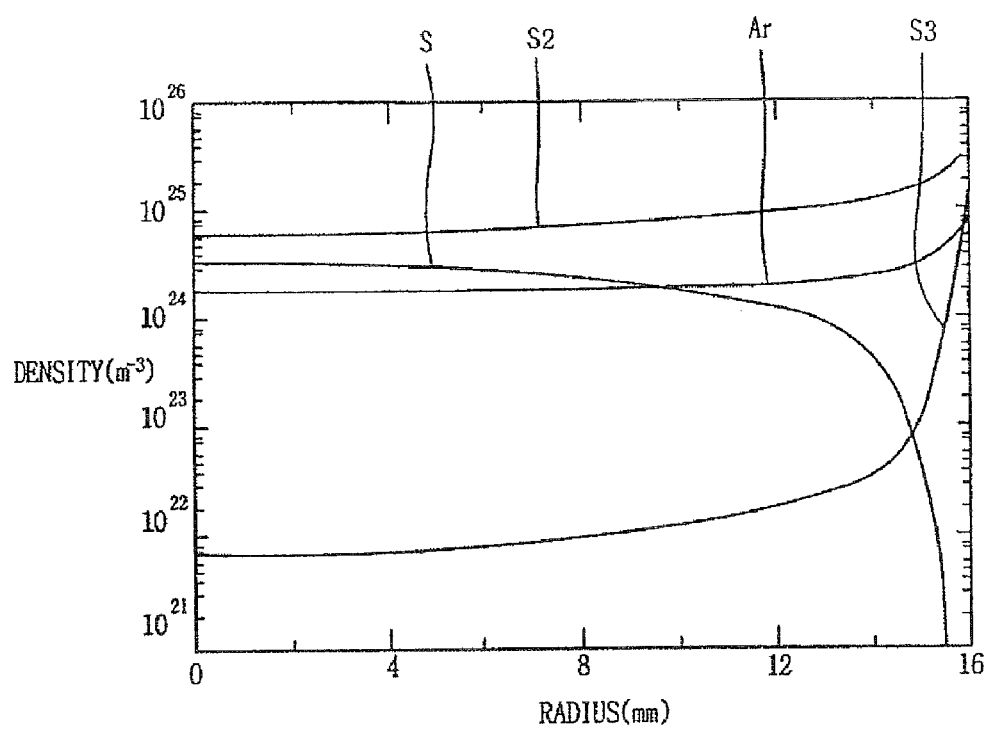
FIG. 3 is a graph for explaining a $S_3$ filter effect.

A high temperature operation type electrodeless bulb of a plasma lighting system and a plasma lighting system having the same according to the present invention will be described in more detail with reference to the accompanying drawings. However, illustration and description of the same components as those shown in FIGS. 1 and 2 will be omitted First, a preferred embodiment of a high temperature operation type electrodeless bulb of a plasma lighting system according to one aspect of the present invention will be described.

Figure 4:
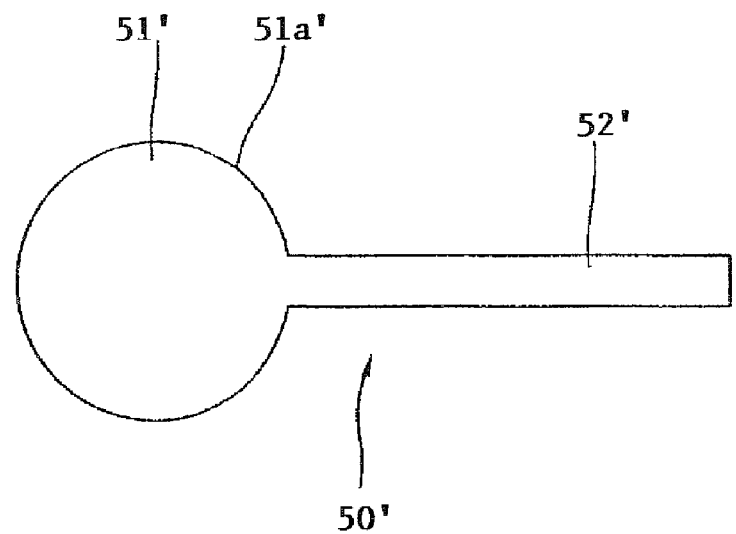
FIG. 4 is a schematic view for explaining a high temperature operation type electrodeless bulb of a plasma lighting system according to one aspect of the present invention.
Figure 5:
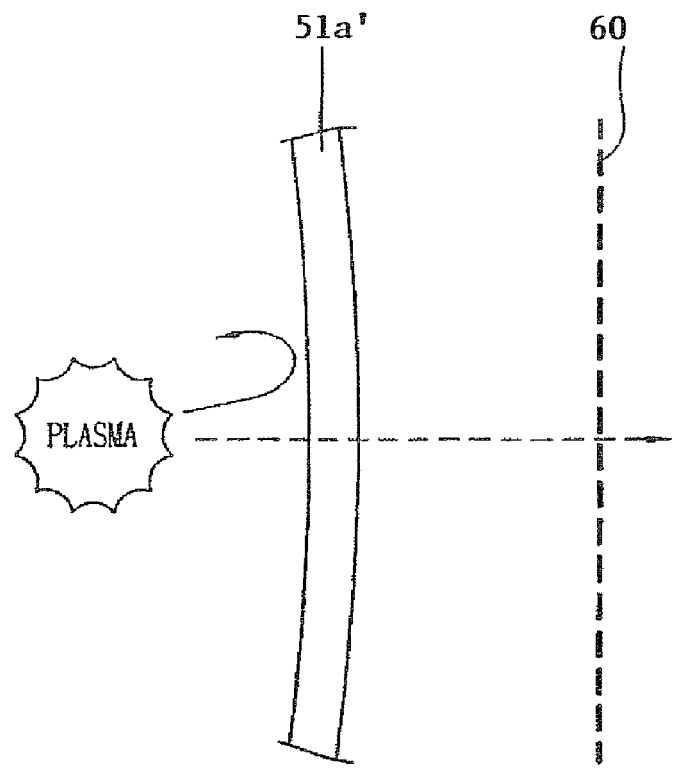
FIG. 5 is a concept view for explaining the operation of the electrodeless bulb of FIG. 4.
Figure 6:
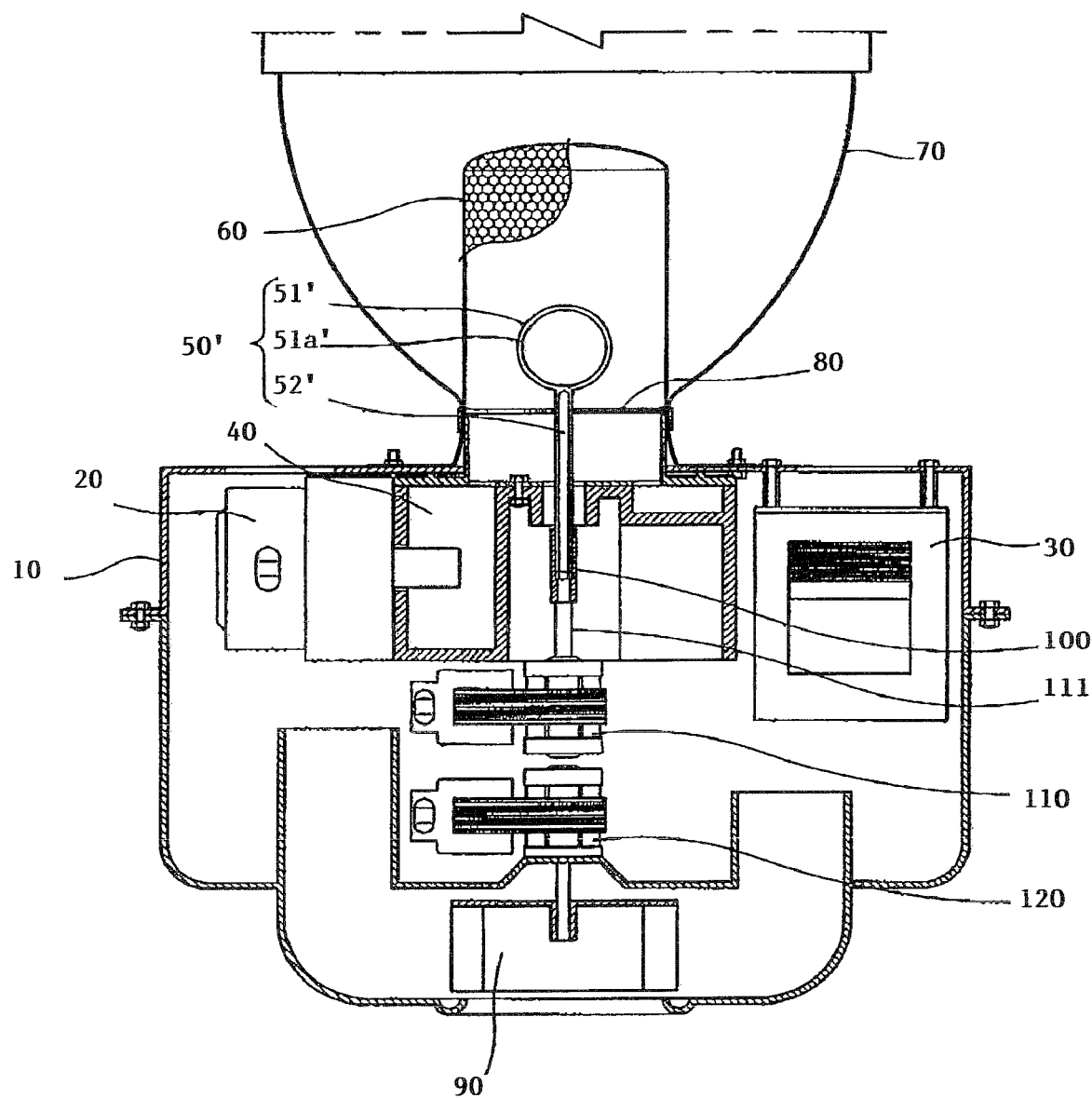
FIG. 6 is a vertical cross sectional view showing a plasma lighting system including the electrodeless bulb of FIG. 4.

FIG. 4 is a schematic view for explaining a high temperature operation type electrodeless bulb of a plasma lighting system according to one aspect of the present invention. FIG. 5 is a concept view for explaining the operation of the electrodeless bulb of FIG. 4.

The high temperature operation type electrodeless bulb 50' according to the present invention includes: a luminous unit 51' formed by an outer surface 51a' defining an inner space for enclosing luminous materials, such as diatomic sulfur molecules; and a supporting unit 52' whose one end is connected to the outer surface 51a' of the luminous unit 51' and whose the other end is coupled to a rotation shaft 111 of a bulb motor 110.

Here, the outer surface 51a' is made of glass having selective permeability that effectively transmits visible light generated in the excitation of the luminous materials, and does not transmit but reflects infrared rays generated in the excitation thereof. As such glass, for example, low emissivity glass is used.

If the outer surface 51a' is made of low emissivity glass, the visible light generated in the excitation of the luminous materials effectively transmits the electrodeless bulb 50', to thereby improve the emission efficiency of the bulb 50'. Further, the infrared rays reflected without transmitting the outer surface 51a' maintains the temperature of the luminous unit 51' at a high temperature level. As the temperature of the luminous unit 51' is maintained at a high temperature level, the excitation of the luminous materials is carried out smoothly, and hence the emission efficiency of the bulb 50' is improved.

Moreover, as the temperature of the luminous unit 51' is maintained at a high temperature level, triatomic sulfur molecules are decomposed into diatomic sulfur molecules. Therefore, the ratio of triatomic sulfur molecules is lowered, and thus the $S_3$ filter effect is improved. Subsequently, the elements for intercepting the visible light transmitting the outer surface 51a' are decreased, thereby improving the emission efficiency of the bulb 50'.

Furthermore, the emission of infrared rays is reduced by the outer surface 51a' of the luminous unit 51', and thus the resonator 60 arranged to surround the bulb 50' is less exposed to the infrared rays. Subsequently, the case in which, for example, the resonator 60 is deformed due to a high temperature, is alleviated, thereby improving the reliability of the resonator 60.

Next, a preferred embodiment of a high temperature operation type electrodeless bulb of a plasma lighting system according to another aspect of the present invention will be described. Here, the description thereof will be made with reference to FIG. 4 in which the basic components to be used are the same as those of the preceding embodiment.

The high temperature operation type electrodeless bulb 50' according to the present invention includes: a luminous unit 51' formed by an outer surface 51a' defining an inner space for enclosing luminous materials, such as diatomic sulfur molecules; and a supporting unit 52 whose one end is connected to the outer surface 51a' of the luminous unit 51' and whose the other end is coupled to a rotation shaft 111 of a bulb motor 110.

Here, the outer surface 51a' defining the luminous unit 51' is made of borosilicate glass The borosilicate glass is glass that contains boron oxide $B_2O_3$ as an acidic component, as well as silica powder. The borosilicate glass includes, for example, Pyrex, alumina glass and so on.

Pyrex is a special glass that was developed in 1915 by Corning Inc. having its principal located at One Riverfront Plaza, Corning, N.Y., the United States, and is a representative borosilicate glass containing approximately 80% silica powder and approximately 14% boron powder. Pyrex is characterized by high resistance to thermal shock resistance, high chemical durability and low coefficient of thermal expansion. A typical glass is vitrified at 1,400 to 1,500° C., while the borosilicate glass of this kind is not vitrified unless at a temperature close to 1,600° C. This temperature is a temperature close to the limit of the refractoriness of a crucible, thus decomposition techniques are very difficult. Pyrex has the advantage of low cost and excellent formability because it is more suitable for mass production than quartz glass.

Since the outer surface 51a' of the luminous unit 51' is made of borosilicate glass having a good heat resistance, it is made possible to operate the bulb 50' at a high temperature. Therefore, triatomic sulfur molecules are decomposed into diatomic sulfur molecules, and the ratio of triatomic sulfur molecules is lowered, thereby improving the $S_3$ filter effect. Further, due to the high temperature operation, the excitation of diatomic sulfur molecules is actively performed, thereby improving the emission efficiency of the bulb 50'.

Furthermore, the borosilicate glass has a low cost because it is more capable of mass production than conventional quartz glass. Thus, there is an economical advantage since the costs for the manufacture of the bulb 50' can be reduced.

Finally, a preferred embodiment of a plasma lighting system having a high temperature operation type electrodeless bulb according to another aspect of the present invention will be described. Here, like parts to those shown in the previous drawings are indicated by like numerals used therein.

The plasma lighting system having a high temperature operation type electrodeless bulb according to the present invention includes: a magnetron 20 installed inside a casing 10, for generating microwave; an electrodeless bulb 50' generating light by using luminous materials enclosed in an outer surface 51a' in a plasma state by receiving the microwave generated from the magnetron 20 through a waveguide 40; and a resonator 60 covered on the electrodeless bulb 50', for intercepting the microwave and passing the light.

The outer surface 51a' of the luminous unit 51' is made of low emissivity glass or borosilicate glass as explained above.

The operation of the plasma lighting system according to the present invention will be described below.

According to a command of a controller, the magnetron 20 oscillates due to a high voltage, and generates microwaves having a very high frequency. As the generated microwaves are emitted into the resonator 60 through the wave guide 40, the inert gas enclosed inside the electrodeless bulb 50' is excited.

In this excitation procedure, the luminous materials continuously generate plasma and generate light having an inherent emission spectrum. The light generated from the electrodeless bulb 50' is reflected by the reflecting shade 70 and the dielectric mirror 80 and lights up a space.

At this time, because the outer surface 51a' of the luminous unit 51' is made of low emissivity glass or borosilicate glass, the luminous unit 51' can be operated at a high temperature.

Subsequently, the $S_3$ filter effect in the luminous unit 51' can be improved, and at the same time, the emission efficiency of the bulb 50' can be improved. Further, the overall manufacture cost of the plasma lighting system can be reduced since borosillicate glass is cheaper than conventional quartz glass.

What is claimed is:

1. A high temperature operation type electrodeless bulb for a plasma lighting system, comprising:

a luminous unit that defines a space in which luminous materials are received, the luminous materials comprising sulfur in which triatomic sulfur molecules are decomposed into diatomic sulfur molecules, wherein the luminous unit comprises a low emissivity glass having selective permeability that transmits visible light generated by the luminous unit and that reflects infrared rays back into an interior of the luminous unit so as to maintain a temperature of the interior of the luminous unit at a predetermined high temperature level, wherein the predetermined high temperature level is a temperature at which the luminous materials received in the luminous unit are maintained in an excited state and the triatomic sulfur molecules are decomposed into diatomic sulfur molecules so as to decrease a corresponding shading effect caused by the triatomic sulfur molecules; and a supporting unit that extends from the luminous unit to a predetermined length so as to support the luminous unit within a plasma lighting system in which it is configured to be installed.

2. A plasma lighting system having a high temperature operation type electrodeless bulb, the plasma lighting system comprising:

a high voltage generator;

a magnetron that generates microwaves in response to a high voltage received from the high voltage generator;

an electrodeless bulb, comprising:

a luminous unit that defines a space in which luminous materials are received, the luminous materials comprising sulfur in which triatomic sulfur molecules are decomposed into diatomic sulfur molecules, wherein the luminous unit comprises a low emissivity glass having selective permeability that transmits visible light generated by the luminous unit and that reflects infrared rays into an interior of the luminous unit so as to maintain a temperature of the interior of the luminous unit at a predetermined high temperature level, wherein the predetermined high temperature level is a temperature at which the luminous materials received in the luminous unit are maintained in an excited state and the triatomic sulfur molecules are decomposed into diatomic sulfur molecules so as to decrease a corresponding shading effect caused by the triatomic sulfur molecules; and a supporting unit that extends from the luminous unit to a predetermined length so as to support the luminous unit; and a resonator that covers the electrodeless bulb, wherein the resonator is configured to intercept microwaves and to transmit light emitted by the electrodeless bulb.

* * * * *